W. SCHMID.
FISHLINE REEL.
APPLICATION FILED JAN. 24, 1921.
1,421,839.
Patented July 4, 1922.
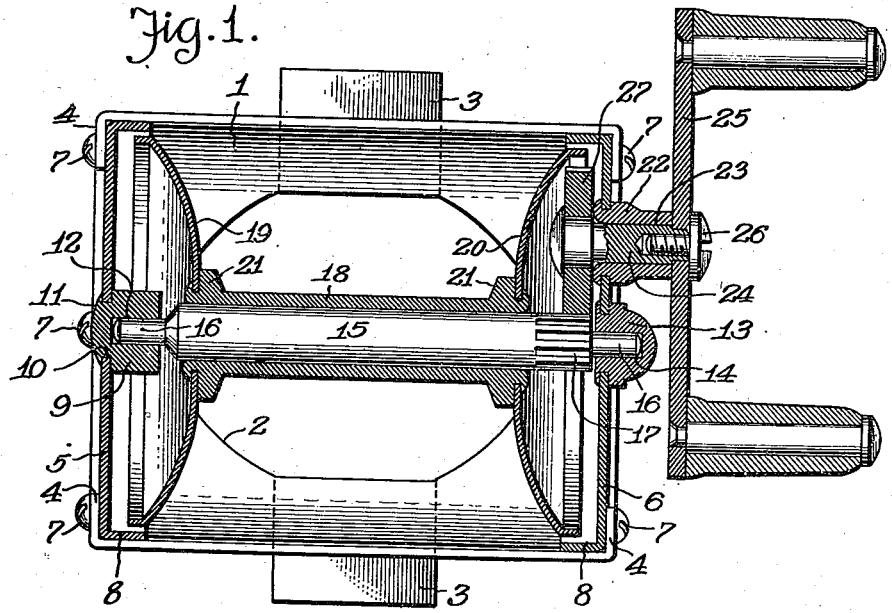
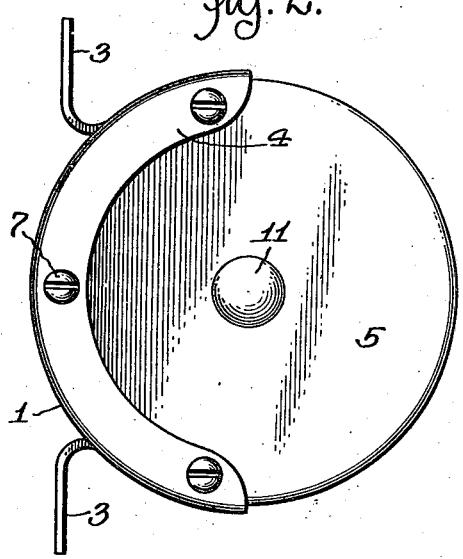
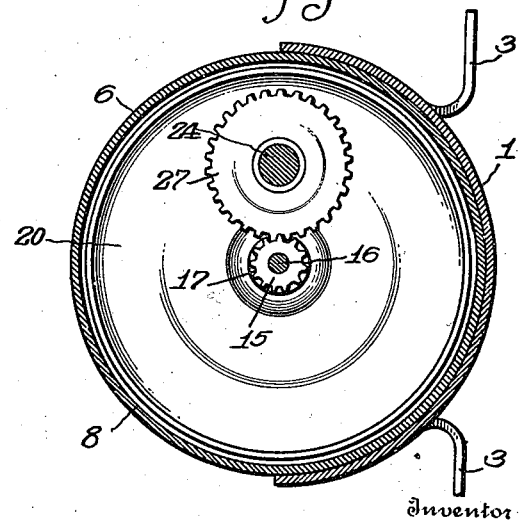
Inventor
William Schmid,
By
Attorneys

UNITED STATES PATENT OFFICE.

WILLIAM SCHMID, OF BRONSON, MICHIGAN.

FISHLINE REEL.

1,421,839. Specification of Letters Patent. Patented July 4, 1922.

Application filed January 24, 1921. Serial No. 439,354.

*To all whom it may concern:*

Be it known that I, WILLIAM SCHMID, a citizen of the United States of America, residing at Bronson, in the county of Branch and State of Michigan, have invented certain new and useful Improvements in Fishline Reels, of which the following is a specification, reference being had therein to the accompanying drawings.

This invention relates to fish line reels, and the primary object of my invention is to provide a simple, durable and inexpensive reel consisting of comparatively few parts that are easy to assemble and maintained in operatable condition.

Another object of this invention is to provide a fish line reel embodying a novel reel frame, devoid of pillars, and of such construction as to firmly hold reel heads with a spool therebetween, so that easy access may be had to the spool should a line become entangled thereon.

A further object of this invention is to provide a fish line reel wherein a spool end member cooperates with a head of the reel in providing an end chamber containing the greater part of the spool driving mechanism, such construction simplifying the reel and permitting of the driving mechanism being oiled and the reel cleaned.

The above and other objects are attained by a construction that will be hereinafter described and then claimed, and reference will now be had to the drawing, wherein Figure 1 is a longitudinal sectional view of the fish line reel;

Fig. 2 is an end view of the same, and

Fig. 3 is a cross sectional view of the reel showing a portion of the spool driving mechanism.

In the drawing, the reference numeral 1 denotes a substantially semi-cylindrical reel frame or body which has its cylindrical wall cut away, as at 2, with portions thereof bent outwardly and disposed at a tangent to the wall of the frame or body 1 to provide reel seat members 3 which are in a common plane and are adapted to be held on a fishing rod in the usual and well known manner. In cutting away the cylindrical wall of the frame or body 1 the weight of the frame or body is materially reduced and portions thereof utilized for the reel seat members.

The ends of the reel frame or body 1 have end flanges 4 providing head seats which are angular in cross section, and besides affording head seats the flanges 4 add rigidity to the reel frame and protect portions thereof.

5 and 6 denotes flanged heads mounted on the head seats of the reel frame and detachably retained thereon by screws 7 or other fastening means extending through the end flanges 4 of the reel frame into the heads 5 and 6. The heads 5 and 6 are somewhat cup shaped with the open sides thereof confronting each other and the flanges 8 of said heads engaging the semi-cylindrical wall of the reel frame or body 1.

9 denotes a bearing concentric of the reel head 5 and projecting inwardly therefrom, said bearing having its outer end reduced to snugly fit in a central opening 10 provided therefor in the head 5, and the reduced end of the bearing is upset or riveted, as at 11, so that the bearing 9 will be a fixture relative to the reel head 5. The inner end of the bearing 9 has a pintle recess 12 which will be hereinafter referred to.

13 denotes a bearing concentric with the reel head 6 and this bearing is somewhat similar to the bearing 9, with the exception that the greater part of the bearing 13 extends outwardly from the head 6, otherwise the bearing 13 has a pintle recess 14 and is connected to the reel head 6 similar to the connection between the bearing 9 and the reel head 5. With the bearing 13 projecting outwardly from the reel head 6 there is clearance within said reel head for spool driving mechanism.

15 denotes a spool shaft having its ends reduced to provide pintles 16 which extend into the recesses 12 and 14 of the bearings 9 and 13 respectively. That end of the spool shaft 15, adjacent the reel head 6, is formed with a pinion 17, and suitably mounted on the spool shaft 15 is a spool sleeve 18 having its ends provided with fixed end members or abutments 19 and 20, each of which is convexo-concave or dished so that the confronting convex walls thereof may cooperate with the spool sleeve 18 in providing an annular fish line holder on which a fish line may be easily wound and unwound. To hold the end members 19 and 20 relative to the spool sleeve 18, this spool sleeve has end portions 21 which may be fitted in concentric openings of the end members 19 and 20 and then clenched or riveted so that the end members will be firmly anchored against the end portions 21 of the spool sleeve 18 said spool sleeve, its end members and the spool shaft being a bench or machine assembled structure that may be bodily removed from the reel frame and from between the heads thereof. The end members 19 and 20 of the spool extend into the heads 5 and 6 with the peripheral edges of the end members in proximity to the flanges 8 of said heads, and the end member 20 has a concave side cooperating with the reel head 6 in forming a head chamber for the spool driving mechanism, while the end member 19 cooperates with the spool head 5 in providing another chamber into which the bearing 9 extends.

22 denotes a long bearing or barrel eccentrically disposed in the reel head 6, contiguous to the bearing 13, with the greater part of the bearing 22 projecting from said reel head. The bearing 22 is connected to the reel head 6 similar to the bearing 13 and journaled in the bore 23 of the bearing or barrel 22 is a stub shaft 24 having its outer end reduced to receive a crank 25 of the usual and well known construction, said crank being retained on the outer end of the shaft 24 by a detachable screw 26 or other fastening means. The bearing or barrel 22 affords sufficient bearing for the stub shaft 24 to prevent wobbling thereof, and suitably mounted on the inner end of the stub shaft 24, within the head chamber, is a large driving gear 27 meshing with the spool pinion 17. The driving gear 27 meshes with the end of the spool pinion 17 so as not to interfere with the end member 20 of the spool and with the driving gear 27 in proximity to the reel head 6 and the end of the spool shaft 17 there is less strain on the bearings 22 and 13, and consequently the driving mechanism may be at all times maintained in proper alinement relative to other parts of the reel, and should the reel be taken apart for cleaning or other purposes the driving mechanism can be properly assembled.

Considering the reel from a "take-apart" standpoint, it is obvious that when the screws 7 are removed that the heads 5 and 6 with the spool and driving mechanism may be bodily removed from the reel frame or body 1. Then it is a simple matter to endwise withdraw the heads 5 and 6 from the ends of the spool, so that with the reel disassembled there are practically four parts each of which may be thoroughly cleaned and then readily assembled. In this type of reel I have aimed to provide as few parts as possible without sacrificing strength and durability, also with the idea of providing a "wide open" reel, devoid of pillars or other longitudinal members that might interfere with the insertion of the fingers for untangling a line on the reel spool. The various parts of the reel can be finished so as not to corrode and at the same time present a neat appearance, and it is obvious that in some grades better bearings may be provided for the pintles of the reel spool.

While in this application there is disclosed a preferred embodiment of the present invention, it is to be understood that the structural elements are susceptible to such variations and modifications as fall within the scope of the appended claims.

What I claim is:—

1. A fishline reel comprising spaced heads having annular integral flanges imparting a cup shape to said heads, a supporting frame devoid of pillars and having an unobstructed open side in which said heads are set with the flanges of said heads in confronting relation, a spool between said heads and having end members extending into the cup shaped heads in proximity to the flanges thereof and cooperating with said heads in providing head chambers, and a spool driving mechanism in one of said head chambers.

2. A fishline reel as in claim 1, characterized by an end member of said spool overhanging a portion of the spool driving mechanism.

3. As a new article of manufacture, a substantially semi-cylindrical reel frame adapted for attachment to a fish rod and having end flanges in opposed relation affording reel head seats, said frame being formed from a semi-cylindrical member having end members cut away to provide the end flanges and the cylindrical wall cut and portions thereof bent outwardly to provide longitudinal reel seat engaging members.

In testimony whereof I affix my signature in presence of two witnesses.

WILLIAM SCHMID.

Witnesses:
 BURTON P. TAGGART,
 HELEN I. BOWKER.